Figure 2:
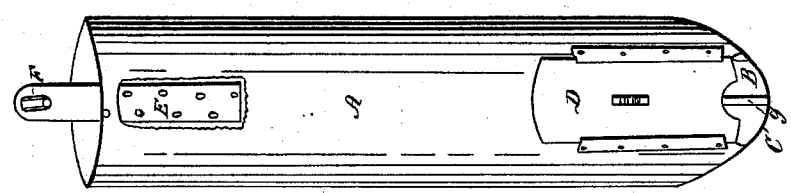
Figure 2:
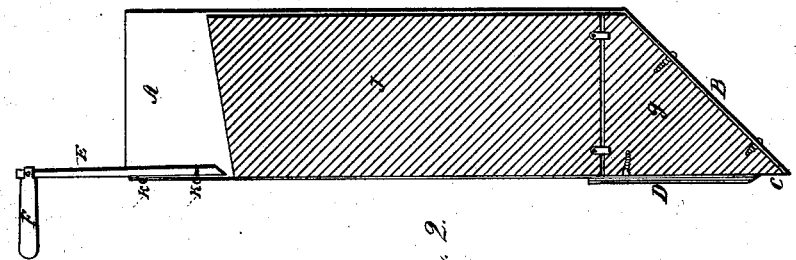
Figure 1:
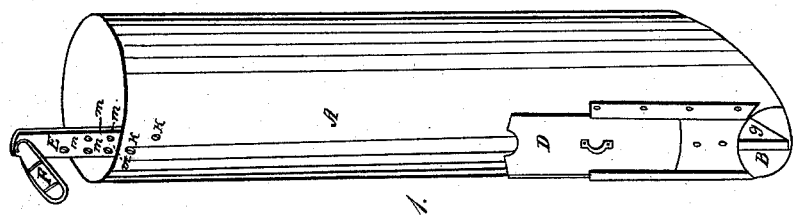

D. C. COLBY.
Hand Fertilizing Distributor.

No. 48,155

Patented June 13, 1865.

Witnesses:
Joseph H. Littlefield
J. C. Sargent

Inventor:
Daniel C. Colby

UNITED STATES PATENT OFFICE.

DANL. C. COLBY, OF CLAREMONT, NEW HAMPSHIRE.

IMPLEMENT FOR DISTRIBUTING FERTILIZERS TO GROWING PLANTS.

Specification forming part of Letters Patent No. 48,155, dated June 13, 1865.

*To all whom it may concern:*

Be it known that I, DANIEL C. COLBY, of Claremont, in the county of Sullivan and State of New Hampshire, have invented certain new and useful improvements in an implement for distributing plaster, phosphates, guano, bone-dust, ashes, and other similar fertilizers to the growing crops or in the hills at the time of planting, which I denominate "Colby's Hand Phosphate and Ashes Distributer;" and I do hereby declare the following to be a full and exact description of the same, reference being had to the drawings that accompany and form a part of this specification, in which—

Figure I is a perspective view of the implement as it would hang in the operator's hand when used. Fig. II is a sectional view, showing the implement bisected perpendicularly. Fig. III is a front view, showing the orifice C partially closed, and displaying also the means used for raising and lowering the handle F.

Letter A represents a box, cylindrical or square, some twenty inches in height and five inches in diameter; letter B, the bottom of said box, placed at an angle of forty-five degrees, or nearly so, as may be seen in Fig. II; C, an opening in the front lower edge of the box A as a discharge-orifice; D, a slide with which the orifice C is more or less closed, to regulate the flow of the fertilizer; E, a standard, made of wood and rising four or five inches above the top front side of the box A, and extending downward about the same number of inches; F, the handle by which the implement is carried and used; g, an angular piece of thin board, and being fastened to the box A and resting upon the bottom B, as seen in Fig. II, acts as a support thereto; h and i, the two opposite ends of the slide D, said slide being used either end down, at pleasure; k k, screws which fasten the standard E to the box A; m m m, &c., a series of holes to provide for raising and lowering the handle F.

The object of my invention is to provide for the farmer a cheap and effective implement by which he may not only distribute such like fertilizers as are mentioned above in the most rapid and easy manner, avoiding the slow and laborious process and stooping posture heretofore necessary, but may also, at the same time, regulate the manner of leaving the deposit, whether compact or more scattered— whether by the side of the plants or beneath the leaves thereof.

To enable others skilled in the art to make and use my invention, I will give a more particular description of its construction and mode of operation.

I make the box A of wood, heavy-plate tin, or light sheet-iron; the bottom of wood or sheet-iron; the stay g of wood, about one-half inch in thickness, and arranged as shown in Fig. II. The upper edge of this strip g serves a valuable purpose in breaking the fertilizer in the box A, and thus prevent its packing as it would otherwise sometimes do when moist.

The slide D may be used either end down, one end being so constructed as to scatter the deposit somewhat, the other to leave it compact.

This implement may be made entirely of wood, if found more desirable.

One distinguishing feature of my invention is the use of the inclined bottom B and having the discharge-orifice frontward instead of downward, thus securing a direction to the fertilizer that carries it quite under and among the plants, and not on top of them.

I put the handle F on running from the front backward through the standard E, so that said handle may not be in the way of filling the box A. This arrangement of the handle also causes the lower end of the box A to incline forward when lifted, thus adding to the tendency already produced in the fertilizer to be thrown forward as it leaves the orifice C. The standard E has a series of holes, m m m, &c., as seen in Fig. III, by which the handle F is raised or lowered at pleasure.

The flow of the fertilizer should, of course, be intermittent, and this is secured as follows: Take the implement in hand so that the orifice C shall look frontward, give it a forcible depression, and then arrest this motion suddenly just in front of each hill, taking care to have the discharge-orifice C toward the hill or plants.

Many farmers desire to drop more than one kind of fertilizer in the hill at planting, but not to mix them until they touch the soil. I accomplish this in a most admirable manner, as follows: Place a temporary partition in the box A, as indicated by the red lines in Fig. II, then put one of the substances to be dropped in one side and the other in the other side, and a portion of each will be shaken out at each motion of the implement and will mix as they strike the soil.

One hour's use of my machine will prove its great labor-saving properties, besides showing it to afford a cleanly and easy method of doing otherwise dirty and laborious work.

Now, I do not claim the box A, broadly, nor the peculiar motion given to it to cause the intermittent flow of the fertilizer; but What I do claim, and desire to secure by Letters Patent, is—

The combination of the inclined bottom B, the stay $g$, the slide D, the temporary partition J, and the standard E with the box A, as and for the purposes set forth.

DANIEL C. COLBY.

Witnesses:
 JOSEPH H. LITTLEFIELD,
 J. C. SARGENT.